(12) United States Patent
Zhou et al.

(10) Patent No.: US 11,483,383 B2
(45) Date of Patent: Oct. 25, 2022

(54) DATA REPORTING METHOD AND SYSTEM

(71) Applicant: GUIZHOU BAISHANCLOUD TECHNOLOGY CO., LTD., Guiyang (CN)

(72) Inventors: Zebin Zhou, Guiyang (CN); Yachuan Chen, Guiyang (CN); Hui Miao, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 157 days.

(21) Appl. No.: 16/821,643

(22) Filed: Mar. 17, 2020

(65) Prior Publication Data

US 2020/0220769 A1 Jul. 9, 2020

Related U.S. Application Data

(63) Continuation of application No. PCT/CN2018/106156, filed on Sep. 18, 2018.

(30) Foreign Application Priority Data

Sep. 18, 2017 (CN) .......................... 201710839107.9

(51) Int. Cl.
*H04L 67/101* (2022.01)
*H04L 41/0631* (2022.01)
(Continued)

(52) U.S. Cl.
CPC ........ *H04L 67/101* (2013.01); *G06F 11/2069* (2013.01); *G06F 21/31* (2013.01);
(Continued)

(58) Field of Classification Search
CPC . H04L 67/1014; H04L 67/101; H04L 47/765; H04L 9/0819; H04L 9/14;
(Continued)

(56) References Cited

U.S. PATENT DOCUMENTS

2006/0167903 A1 7/2006 Smith et al.
2008/0244721 A1* 10/2008 Barrus ................. H04L 9/0819
726/9
(Continued)

FOREIGN PATENT DOCUMENTS

| CN | 102056324 A | 5/2011 |
|---|---|---|
| CN | 103533661 A | 1/2014 |

(Continued)

OTHER PUBLICATIONS

World Intellectual Property Organization (WIPO) International Search Report for PCT/CN2018/106156 dated Dec. 12, 2018 5 Pages.
Intellectual Property Office of Singapore Search Report and Written Opinion for Application No. 11202002313Y dated Apr. 13, 2021 10 pages.

*Primary Examiner* — Kyung H Shin
(74) *Attorney, Agent, or Firm* — Anova Law Group, PLLC

(57) ABSTRACT

A data reporting method includes generating a data uploading token by a main network node, determining, from a plurality of data-uploading network nodes waiting for data uploading, a plurality of qualified network nodes having a data uploading qualification, allowing the qualified network nodes to compete for the data uploading token, and coordinating a data uploading operation with a winning network node of the qualified network nodes that obtained the data uploading token.

10 Claims, 1 Drawing Sheet

(51) Int. Cl.
  *H04L 41/0668* (2022.01)
  *H04W 28/06* (2009.01)
  *H04L 9/32* (2006.01)
  *G06F 21/31* (2013.01)
  *G06F 11/20* (2006.01)
  *H04L 9/08* (2006.01)
  *H04L 67/04* (2022.01)
  *H04L 12/417* (2006.01)

(52) U.S. Cl.
  CPC .......... *H04L 9/0819* (2013.01); *H04L 9/3228* (2013.01); *H04L 41/0631* (2013.01); *H04L 41/0668* (2013.01); *H04L 67/04* (2013.01); *H04W 28/06* (2013.01); *G06F 2212/178* (2013.01); *H04L 12/417* (2013.01)

(58) Field of Classification Search
  CPC . H04L 67/1097; H04L 67/04; G06F 21/6254; G06F 11/1464; G06F 11/1461
  See application file for complete search history.

(56) References Cited

U.S. PATENT DOCUMENTS

2011/0306326 A1* 12/2011 Reed ................ H04L 67/04
  455/414.1
2017/0264675 A1* 9/2017 Yao ................ H04L 67/101

FOREIGN PATENT DOCUMENTS

| | | |
|---|---|---|
| CN | 103813481 A | 5/2014 |
| CN | 104199888 A | 12/2014 |
| CN | 104735698 A | 6/2015 |
| CN | 105872568 A | 8/2016 |
| CN | 106202074 A | 12/2016 |
| CN | 106302090 A | 1/2017 |
| CN | 106790532 A | 5/2017 |
| CN | 107707385 A | 2/2018 |
| EP | 1975847 A1 | 10/2008 |

* cited by examiner

DATA REPORTING METHOD AND SYSTEM

CROSS-REFERENCE TO RELATED APPLICATIONS

The present application is a continuation of International Application No. PCT/CN2018/106156, filed on Sep. 18, 2018, which claims priority to Chinese Patent Application No. 201710839107.9 filed to the CNIPA on Sep. 18, 2017 and entitled "DATA REPORTING METHOD AND SYSTEM," the entire content of which is incorporated herein by reference.

TECHNICAL FIELD

The embodiments of the present disclosure relate to, but are not limited to, the field of wireless network communication, and in particular to a data reporting method and system.

BACKGROUND

During the data reporting, single-server reporting, single-room cluster reporting or multi-room active/standby reporting are generally employed in the existing technologies. The multi-room active/standby reporting is mainly cold standby. Here, the cold standby refers to manual switching.

The data reporting methods in the existing technologies have the following disadvantages:

(1) the server fails suddenly;
(2) when a sudden network problem occurs in the computer room where the server is located, the data acquired by the server is incomplete, resulting in data incompleteness;
(3) when a sudden network problem occurs in the computer room where the server is located, the data reported by the sever fails; and
(4) after a fault occurs, manual intervention is required to switch between active and standby modes, and hence processing time is long and the data timeliness is affected.

Among the above methods, the single-server reporting has the defects of items (1), (2) and (3), the single-room cluster reporting has the detects of items (2) and (3), and the multi-room active/standby reporting has the detect of above item (4).

Thus, during the data reporting, when the server storing data is faulty, the network condition of the server is poor or the stored data is incomplete, it is usually possible to use a monitoring alarm and manually switch to a standby server to report data. However, in this method, mutual intervention is required, and it will take a long time from the occurrence of a fault, the discovery of the fault to the resolution of the fault, so that long-time data reporting will be affected and the real-time performance of data is greatly reduced.

Therefore, there is a need for a data reporting method and system which can automatically evade faults to complete data reporting and ensure the integrity of data.

SUMMARY

In order to solve the problems on data reporting in the existing technologies, a data reporting method and system are provided, which can automatically evade faults to complete data reporting when a server fails, and ensure the integrity of data.

In accordance with an aspect of the embodiments of the present disclosure, a data reporting method is provided, including:

step 1: generating a data uploading token by a main network node;
step 2: determining whether each network node waiting to upload data has a data uploading qualification; and
step 3: network nodes with the data uploading qualification competing for the data uploading token, and execute a data uploading operation by a network node that obtains the data uploading token.

In this disclosure, a network node waiting to upload data is also referred to as a "data-uploading network node," a data-uploading network node with the data uploading qualification is also referred to as a "qualified network node," and a qualified network node that obtained the data uploading token is also referred to as a "winning network node."

Step 2 includes:

acquiring, by each network node, the integrity of data to be uploaded stored thereon, and determining that the network node has a data uploading qualification when the integrity is determined to be greater than or equal to a set threshold.

Step 2 further includes:

acquiring, by each network node, meta-information related to the data to be uploaded, and synchronizing the meta-information with other network nodes; and
selecting a maximum value from the meta-information of each network node, and using a ratio of the meta-information of the network node to the maximum value as the integrity of the data to be uploaded by the network node.

Step 3 includes:

transmitting, by a network node with the data uploading qualification, a request for acquiring the data uploading token to the main network node; and
determining, by the main network node, whether the data uploading token is in a released state, and, if so, issuing the data uploading token to a network node that first requests for the data uploading token and then setting the data uploading token to be in an occupied state.

After step 3, the method further includes:

releasing the data uploading token by the network node that obtains the data uploading token after uploading data, determining whether data is uploaded successfully, and notifying other network nodes to stop competing for the data uploading token if the data is uploaded successfully.

Step 3 further includes:

upon transmitting, to the main network node, a request for acquiring the data uploading token, by the network node, transmitting, to the main network node, a time threshold for releasing the data uploading token; and
after the main network node issues the data uploading token to the network node that first requests for the data uploading token, performing timing, and setting, by the main network node, the data uploading token to be in a released state if the timing time reaches the time threshold transmitted by the network node that obtains the data uploading token.

In accordance with another aspect of the embodiments of the present disclosure, a data reporting system is provided, which is located on a network node, the system including:

a token generation module configured to generate a data uploading token when the network node is a main network node;
a qualification determination module configured to determine whether the network node has a data uploading qualification;
a token competition module configured to compete for the data uploading token; and a data uploading module configured to execute a data uploading operation when the data uploading token is obtained.

The qualification determination module is further configured to:

acquire the integrity of data to be uploaded stored thereon, and determine to have a data uploading qualification when the integrity is determined to be greater than or equal to a set threshold.

The qualification determination module is further configured to:

acquire meta-information related to the data to be uploaded, and synchronize the meta-information with other network nodes; and select a maximum value from the meta-information of each network node, and use a ratio of the meta-information of the network node to the maximum value as the integrity of the data to be uploaded by the network node.

The token competition module is further configured to:

transmit, to the main network node, a request for acquiring the data uploading token; and the system further includes a token management module configured to determine whether the data uploading token is in a released state, and, if so, issue the data uploading token to a network node that first requests for the data uploading token and then set the data uploading token to be in an occupied state.

The system further includes:

an uploading management module configured to release the data uploading token after data uploading, determine whether data is uploaded successfully, and notify other network nodes to stop competing for the data uploading token if the data is uploaded successfully.

The token competition module is further configured to:

upon transmitting, to the main network node, a request for acquiring the data uploading token, transmit, to the main network node, a time threshold for releasing the data uploading token; and the token management module is further configured to: after issuing the data uploading token to the network node that first requests for the data uploading token, perform timing, and set, by the main network node, the data uploading token to be in the released state if the timing time reaches the time threshold transmitted by the network node that obtains the data uploading token.

In accordance with the data reporting method and system provided in the embodiments of the present disclosure, data uploading is performed by a network node with a higher data integrity, so that the integrity of data is ensured. Moreover, when a fault occurs in a server of a network node, data uploading can be automatically switched to a server of another network node without manual intervention, so that the processing time for data uploading is shortened and the data timeliness is ensured.

BRIEF DESCRIPTION OF THE DRAWINGS

The drawings incorporated into this specification and constituting a part of this specification show the embodiments of the present disclosure, and are used together with the description to explain the principles of the embodiments of the present disclosure. Throughout the drawings, similar reference numerals represent similar elements. The drawings to be described hereinafter are some but not all of the embodiments of the present disclosure. A person of ordinary skill in the art may obtain other drawings according to these drawings without paying any creative effort. In the drawings.

DETAILED DESCRIPTION OF THE EMBODIMENTS

The technical solutions in the embodiments of the present disclosure will be clearly described below with reference to the drawings in the embodiments of the present disclosure. Apparently, the described embodiments are some but not all of the embodiments of the present disclosure. All other embodiments obtained by a person of ordinary skill in the art based on the embodiments of the present disclosure without paying any creative effort shall fall into the scope of the embodiments of the present disclosure. It is to be noted that the embodiments in the present application and the features in the embodiments can be combined in any way if not conflicted.

Figure 1:
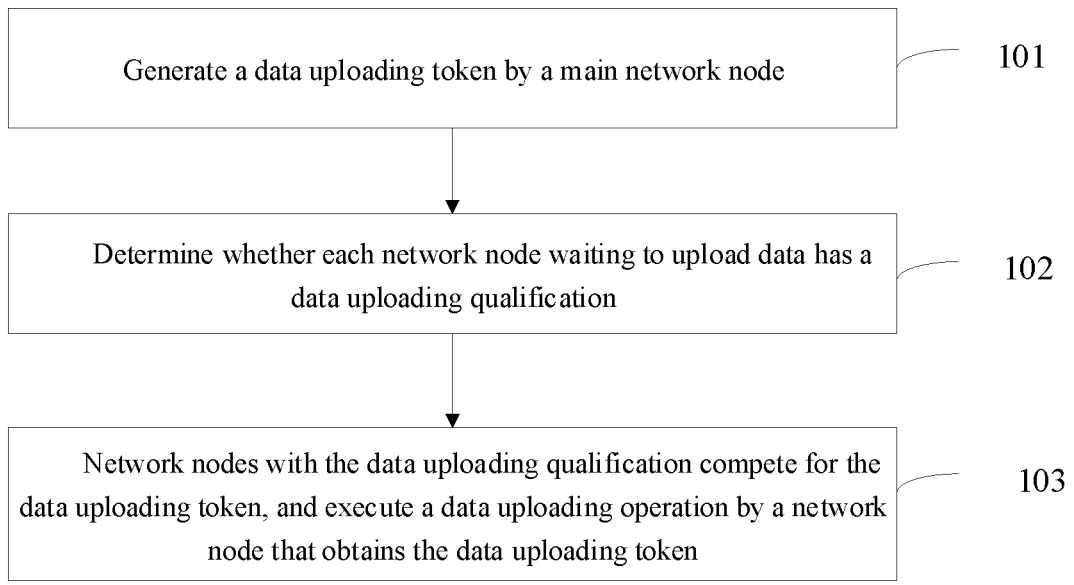
FIG. 1 is a flowchart of a data reporting method according to an embodiment of the present disclosure.

An embodiment of the present disclosure provides a data reporting method. As shown in FIG. 1, the method includes the following steps.

Step 101: a data uploading token is generated by a main network node.

Step 102: It is determined whether each network node waiting to upload data has a data uploading qualification.

Step 103: Network nodes with the data uploading qualification compete for the data uploading token, and a data uploading operation is executed by a network node that obtains the data uploading token.

There are at least three network nodes which may be network nodes across computer rooms, across operators. The plurality of network nodes across computer rooms, across operators can ensure that the quality of data uploading will not be affected when the network quality of one network node is poor.

The main network node may be elected by the network nodes, or the system may default one of the network nodes as a main network node, or the main network node may be determined according to a selection rule. If the main network node is elected, when the entire system is started, that is, the data uploading is started, the network nodes will elect the main network node. During the election, the main network node needs to be voted by majority of the network nodes. The specific election method is known to those skilled in the art and will not be repeated here. The main network node will establish a network connection with other network nodes. The connection may be a persistent ordinary network connection.

The data uploading token is unique. That is, after a network node obtains the data uploading token, other network nodes cannot upload data until the network node that obtains the data uploading token uploads data and releases the data uploading token. At this time, other network nodes may obtain the data uploading token. The state of the data uploading token is set by the main network node. When the main network node issues the data uploading token to other network nodes, the data uploading token is set to be in an occupied state; and, when the network node releases the data uploading token, the main network node is also notified so that the main network node sets the data uploading token to be in a released state.

After it is determined that each network node has its own data uploading qualification, the network node will transmit, to the main network node, a request for acquiring the data uploading token. The main network node issues the data uploading token to the network node that first requests for the data uploading token.

Step 102 includes: acquiring, by each network node, the integrity of data to be uploaded stored thereon, and determining that the network node has a data uploading qualification when the integrity is determined to be greater than or equal to a set threshold.

Step 102 further includes: acquiring, by each network node, meta-information related to the data to be uploaded, and synchronizing the meta-information with other network nodes; and, selecting a maximum value from the meta-information of each network node, and using a ratio of the meta-information of the network node to the maximum value as the integrity of the data to be uploaded by the network node.

The synchronization of the meta-information between each network node waiting to upload data and other network nodes is performed in the following ways, where the synchronization means acquiring information of each other:

way 1: if one of two network nodes that synchronize the meta-information with each other is the main network node, the main network node and other network nodes synchronize their respective meta-information through the established connection; and way 2: if two network nodes that synchronize the meta-information with each other are not the main network node, the two network nodes synchronize their respective meta-information through their respective connections with the main network node.

In other words, each network node only establishes a direct connection with the elected main network node. If the two network nodes are not the main node, there is no direct connection between the two network nodes. Therefore, when information is transmitted between the two network nodes, the information needs to be transferred by the main network node.

The meta-information related to the data to be uploaded may be different according to the type of the data to be uploaded, and is calculated based on the data to be uploaded; and, the integrity of the data to be uploaded on a certain network node can be calculated by using the meta-information. The meta-information may be the sum of the data to be uploaded. For example, when the data to be uploaded is the bandwidth of each network node, the meta-information may be the sum of bandwidths.

Since each network node cannot know the meta-information calculated by the complete data to be uploaded, the integrity of the data to be uploaded is calculated based on the maximum value in the meta-information of the network node. The determination whether a network node has a data uploading qualification is performed based on the integrity. That is, it is determined that the network node has a data uploading qualification when the integrity is greater than or equal to a set threshold. The set threshold may be set as required, for example, 99%.

It is to be noted that the integrity of the data to be uploaded may generally be expressed in form of percentage. When the integrity of the data to be uploaded stored on a network node reaches the set threshold, the network node can upload the stored data and enable a data receiver to receive the quality requirements of the data.

Step 103 includes: transmitting, by a network node with the data uploading qualification, a request for acquiring the data uploading token to the main network node; and, determining, by the main network node, whether the data uploading token is in a released state, and, if so, issuing the data uploading token to a network node that first requests for the data uploading token and then setting the data uploading token to be in an occupied state.

After step 103, the method further includes: releasing the data uploading token by the network node that obtains the data uploading token after uploading the data, determining whether the data is uploaded successfully, and notifying other network nodes to stop competing for the data uploading token if the data is uploaded successfully.

Step 103 further includes: upon transmitting, to the main network node, a request for acquiring the data uploading token, by the network node, transmitting, to the main network node, a time threshold for releasing the data uploading token; and, after the main network node issues the data uploading token to the network node that first requests for the data uploading token, performing timing, and setting, by the main network node, the data uploading token to be in a released state if the timing time reaches the time threshold transmitted by the network node that obtains the data uploading token.

This arrangement is to prevent a situation that other network nodes are unable to upload data since the network node that uploads data is unable to upload data and also occupies the token in case of network interruption. Here, the time threshold is general set according to actual requirements, for example, tens of seconds.

If the data is uploaded successfully, other network nodes are notified to stop competing for the data uploading token in the following ways:

way 1: if the network node that uploads data successfully is the main network node, other network nodes are directly notified to stop competing; and way 2: if the network node that uploads data successfully is not the main network node, a message to stop competing is transmitted to the main network node, and the main network node transmits the message to stop competing to other network nodes.

As described above, each network node only establishes a direct connection with the main network node. If the network node that uploads data successfully is not the main network node, the information needs to be transferred by the main network node.

Additionally, the transmitting, by a network node with the data uploading qualification, a request for acquiring the data uploading token includes: if the network node with the data uploading qualification is the main network node, transmitting, by the main network node, a request for acquiring the data uploading token to its own token management module; and, if the network node with the data uploading qualification is not the main network node, transmitting, by the network node, a request for acquiring the data uploading token to the token management module of the main network node.

Since the main network node is elected from the network nodes waiting to upload data, during the implementation of the data uploading function, the main network node also functions as a data uploading token manager and an information transfer. Thus, when the main network node has a data uploading qualification, the main network node will also transmit, to its own token management module, a request for acquiring the token.

It is to be noted that, in this method, the network nodes that compete for the data uploading token may be network nodes that have the data uploading qualification and never obtain the data uploading token.

The specific steps of the data reporting method provided in this embodiment of the present disclosure will be described below. In this embodiment, there are five network nodes A, B, C, D and E, and the data to be uploaded is the reported bandwidths of the five network nodes.

Step 1: From the five network nodes A, B, C, D and E that are waiting to upload data, the network node B is elected as a main network node, and the main network node B establishes connections with the network nodes A, C, D and E and generates a unique data uploading token.

Step 2: The five network nodes A, B, C, D and E calculate the sum of bandwidths of the network nodes stored thereon as meta-information, and the calculated meta-information of the five network node A, B, C, D and E is 161493570, 160999901, 152964949, 161521593 and 72330513, respectively.

Step 3: The main network node B separately synchronizes the meta-information with the network nodes A, C, D and E, and the network nodes A, C, D and E synchronize the meta-information with each other through the main network node B.

Step 4: For each network node, a maximum value is selected from the meta-information of the five network nodes to calculate the integrity, that is, its own meta-information is divided by the maximum value, where the integrity of the five network nodes A, B, C, D and E is 99.98%, 99.68%, 94.70%, 100.000% and 44.78%, respectively.

Step 5: Each network node determines whether its own integrity is greater than or equal to a preset threshold (i.e., 99%), so that it is determined that the network nodes A, B and D have a data uploading qualification.

Step 6: Each of the network nodes A, B and D with the data uploading qualification transmits, to the main network node, a request for acquiring the data uploading token and a time threshold for releasing the token.

Step 7: Upon receiving the request, the main network node B determines that the data uploading token is in a released state; then, determines that the first received request comes from the network node A so that the data uploading token is issued to the network node A; and, sets the token to be in an occupied state and starts timing.

Step 8: Upon acquiring the token and uploading data, the network node releases the data uploading token, and determines whether the result of data uploading is successful uploading; and, if the result of data uploading is successful uploading, other network nodes are notified to stop competing for the data uploading token.

If the timing of the main network node B reaches the time threshold transmitted by the network node A and a message of successful uploading or a message of releasing token is still not received, the token is automatically released. In this way, the token can be issued after a request for acquiring the token transmitted by other network nodes is received, and the data uploading can be performed continuously.

Additionally, if a network node fails to upload data, this network node can no longer participate in the subsequent competition for the data uploading token.

Figure 2:
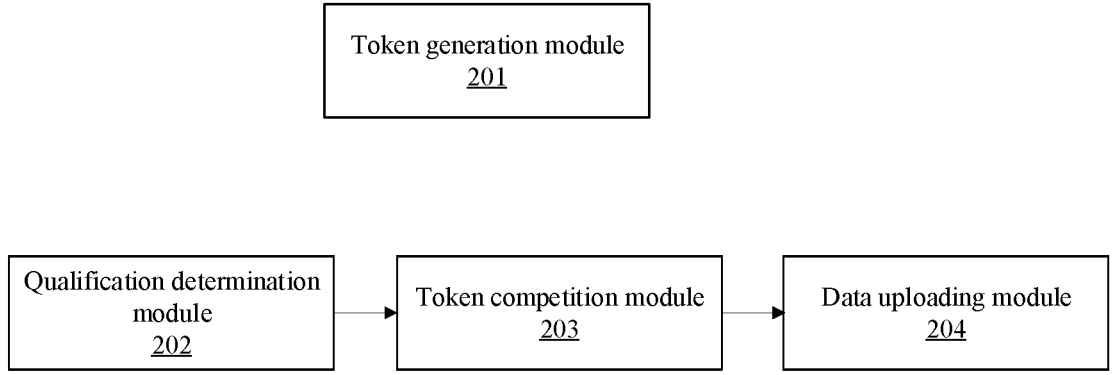
FIG. 2 is a block diagram of a data reporting system according to an embodiment of the present disclosure.

An embodiment of the present disclosure further provides a data reporting system, which is located on a network node. As shown in FIG. 2, the system includes:

a token generation module 201 configured to generate a data uploading token when the network node is a main network node;

a qualification determination module 202 configured to determine whether the network node has a data uploading qualification;

a token competition module 203 configured to compete for the data uploading token; and a data uploading module 204 configured to execute a data uploading operation when the data uploading token is obtained.

The qualification determination module 202 is further configured to:

acquire the integrity of data to be uploaded stored thereon, and determine to have a data uploading qualification when the integrity is determined to be greater than or equal to a set threshold.

The qualification determination module 202 is further configured to:

acquire meta-information related to the data to be uploaded, and synchronize the meta-information with other network nodes; and select a maximum value from the meta-information of each network node, and use a ratio of the meta-information of the network node to the maximum value as the integrity of the data to be uploaded by the network node.

The token competition module 203 is further configured to:

transmit, to the main network node, a request for acquiring the data uploading token; and the system further includes a token management module configured to determine whether the data uploading token is in a released state, and, if so, issue the data uploading token to a network node that first requests for the data uploading token and then set the data uploading token to be in an occupied state.

The system further includes:

an uploading management module configured to release the data uploading token after data uploading, determine whether data is uploaded successfully, and notify other network nodes to stop competing for the data uploading token if the data is uploaded successfully.

The token competition module 203 is further configured to:

upon transmitting, to the main network node, a request for acquiring the data uploading token, transmit, to the main network node, a time threshold for releasing the data uploading token; and the token management module is further configured to: after issuing the data uploading token to the network node that first requests for the data uploading token, perform timing, and set, by the main network node, the data uploading token to be in the released state if the timing time reaches the time threshold transmitted by the network node that obtains the data uploading token.

The present disclosure also provides a data reporting device including a memory and a processor. The memory stores instructions that, when executed by the processor, cause the processor to perform a method consistent with the disclosure, such as one of the above-described example methods. The device can be at any of the above-described network nodes.

The present disclosure also provides a non-transitory computer-readable storage medium storing instructions that, when executed by a processor, cause the processor to perform a method consistent with the disclosure, such as one of the above-described example methods. The storage medium can be at any of the above-described network nodes.

In accordance with the data reporting method and system provided in the embodiments of the present disclosure, data uploading is performed by a network node with higher data integrity, so that the integrity of data is ensured. Moreover, when a fault occurs in a server of a network node, data uploading can be automatically switched to a server of another network node without manual intervention, so that the processing time for data uploading is shortened and the data timeliness is ensured.

The contents described above can be implemented independently or jointly in various ways, and these variants shall fall into the scope of the embodiments of the present disclosure.

It is to be noted that, as used herein, the term "comprise/comprising," "include/including" or any other variants thereof is intended to encompass a non-exclusive inclusion, so that an object or device including a series of elements not only includes these elements, but also includes other elements not listed clearly, or further includes elements inherent to this object or device. Without more restrictions, an element defined by the phrase "comprising . . . " does not exclude the presence of other identical elements in the object or device including this element.

The foregoing embodiments are merely used for describing the technical solutions of the present disclosure and not intended to constitute any limitations thereto. The present disclosure has been described in detail by the preferred embodiments. It should be understood by a person of ordinary skill in the art that, modifications or equivalent replacements can be made to the technical solutions of the present disclosure without departing from the spirit and scope of the technical solutions of the present disclosure, and these modifications or equivalent replacements shall fall into the scope defined by the claims of the present disclosure.

INDUSTRIAL APPLICABILITY

The embodiments of the present disclosure provide a data reporting method and system. Data uploading is performed by a network node with higher data integrity, so that the integrity of data is ensured. Moreover, when a fault occurs in a server of a network node, data uploading can be automatically switched to a server of another network node without manual intervention, so that the processing time for data uploading is shortened and the data timeliness is ensured.

The invention claimed is:

1. A data reporting method comprising:
generating a data uploading token by a main network node;
determining, from a plurality of data-uploading network nodes waiting for data uploading, a plurality of qualified network nodes having a data uploading qualification, including, for each data-uploading network node:
acquiring an integrity of data to be uploaded that is stored on the data-uploading network node, including:
acquiring meta-information related to the data to be uploaded;
synchronizing the meta-information with other data-uploading network nodes; and
determining the integrity of the data to be uploaded as a ratio of the meta-information of the data-uploading network node to a maximum value among the meta-information of the plurality of data-uploading network node; and
determining that the data-uploading network node has the data uploading qualification in response to the integrity being greater than or equal to a threshold;
allowing the qualified network nodes to compete for the data uploading token; and
coordinating a data uploading operation with a winning network node of the qualified network nodes that obtained the data uploading token.

2. The data reporting method according to claim 1, wherein allowing the qualified network nodes to compete for the data uploading token includes:
receiving requests for acquiring the data uploading token from the qualified network nodes;
determining whether the data uploading token is in a released state; and
in response to the data uploading token being in the released state:
issuing the data uploading token to one of the qualified network nodes that requests for the data uploading token earliest in time; and
setting the data uploading token to be in an occupied state.

3. The data reporting method according to claim 2, wherein allowing the qualified network nodes to compete for the data uploading token further includes:
receiving, from the qualified network nodes, time thresholds for releasing the data uploading token along with the requests for acquiring the data uploading token;
performing timing after issuing the data uploading token to the one of the qualified network node that requests for the data uploading token earliest in time; and
in response to a timing reaching the time threshold received from the one of the qualified network nodes that requests for the data uploading token earliest in time, setting the data uploading token to be in the released state.

4. The data reporting method according to claim 1, further comprising:
releasing the data uploading token by the winning network node after data uploading;
determining whether the data uploading is successful; and
in response to the data uploading being successful, notifying other qualified network nodes to stop competing for the data uploading token.

5. A data reporting device at a network node comprising:
a processor; and
a memory storing instructions that, when executed by the processor, cause the processor to:
determine whether the network node has a data uploading qualification, including:
acquiring an integrity of data to be uploaded that is stored on the network node, including:
acquire meta-information related to the data to be uploaded;
synchronize the meta-information with the one or more other network nodes having the data uploading qualification; and
determine the integrity of the data to be uploaded as a ratio of the meta-information of the network node to a maximum value among the meta-information of the network node and the one or more other network nodes having the data uploading qualification; and
determine that the network node has the data uploading qualification in response to the integrity being greater than or equal to a threshold;

in response to determining that the network node has the data uploading qualification, compete with one or more other network nodes having the data uploading qualification for a data uploading token generated by a main network node; and in response to successfully obtaining the data uploading token, execute a data uploading operation.

6. The data reporting device according to claim 5, wherein the instructions further cause the processor to transmit, to the main network node, a request for acquiring the data uploading token.

7. The data reporting device according to claim 6, wherein the instructions further cause the processor to transmit, to the main network node, a time threshold for releasing the data uploading token along with the request for acquiring the data uploading token.

8. The data reporting device according to claim 5, wherein the instructions further cause the processor to:

release the data uploading token after data uploading;

determine whether the data uploading is successful; and in response to the data uploading being successful, notify the one or more other network nodes having the data uploading qualification to stop competing for the data uploading token.

9. A data reporting device at a network node comprising:

a processor; and a memory storing instructions that, when executed by the processor, cause the processor to:

generate a data uploading token;

receive requests for acquiring the data uploading token from a plurality of qualified network nodes;

determine whether the data uploading token is in a released state; and in response to the data uploading token being in the released state:

issue the data uploading token to one of the qualified network nodes that requests for the data uploading token earliest in time; and set the data uploading token to be in an occupied state;

wherein in response to an integrity of data to be uploaded that is stored on a network node being greater than or equal to a threshold, the network node is determined to be the qualified network node having a data uploading qualification; and wherein in response to synchronize meta-information related to the data to be uploaded with the one or more other network nodes having the data uploading qualification, the integrity of the data to be uploaded as a ratio of the meta-information of the network node to a maximum value among the meta-information of the network node and the one or more other network nodes having the data uploading qualification is determined.

10. The data reporting device according to claim 9, wherein the instructions further cause the processor to:

receive, from the qualified network nodes, time thresholds for releasing the data uploading token along with the requests for acquiring the data uploading token;

perform timing after issuing the data uploading token to the one of the qualified network node that requests for the data uploading token earliest in time; and in response to a timing reaching the time threshold received from the one of the qualified network nodes that requests for the data uploading token earliest in time, set the data uploading token to be in the released state.

\* \* \* \* \*